US009127834B2

(12) United States Patent
Bruce

(10) Patent No.: US 9,127,834 B2
(45) **Date of Patent: *Sep. 8, 2015**

(54) CYCLONE SEPARATOR FOR THE PHASE SEPARATION OF A MULTIPHASE FLUID STREAM, STEAM TURBINE SYSTEM HAVING A CYCLONE SEPARATOR AND ASSOCIATED OPERATING METHOD

(75) Inventor: Barnaby Bruce, Erlangen (DE)

(73) Assignee: Areva GmbH, Erlangen (DE)

( * ) Notice: Subject to any disclaimer, the term of this patent is extended or adjusted under 35 U.S.C. 154(b) by 633 days.

This patent is subject to a terminal disclaimer.

(21) Appl. No.: 13/503,100

(22) PCT Filed: Oct. 20, 2010

(86) PCT No.: PCT/EP2010/006407

§ 371 (c)(1), (2), (4) Date: May 21, 2012

(87) PCT Pub. No.: WO2011/047849

PCT Pub. Date: Apr. 28, 2011

(65) Prior Publication Data

US 2012/0227405 A1 Sep. 13, 2012

(30) Foreign Application Priority Data

Oct. 20, 2009 (DE) ......................... 10 2009 050 087

(51) Int. Cl.
*B01D 45/00* (2006.01)
*F22B 37/26* (2006.01)
(Continued)

(52) U.S. Cl.
CPC . *F22B 37/26* (2013.01); *B04C 3/04* (2013.01); *B04C 3/06* (2013.01); *B04C 5/04* (2013.01); *B04C 5/14* (2013.01); *B04C 5/20* (2013.01); *F22B 37/32* (2013.01); *F22B 37/327* (2013.01)

(58) Field of Classification Search
CPC ........ F22B 37/26; F22B 37/327; F22B 37/32; B04C 5/14; B04C 5/04; B04C 5/20; B04C 3/06; B04C 3/04
USPC ............... 55/423, 282.5, 315.2, 434.2–434.4, 55/342.2, 428.1, 337, 466, 459.1, 419; 95/268, 271, 288, 290; 60/653, 670
See application file for complete search history.

(56) References Cited

U.S. PATENT DOCUMENTS 3,349,548 A 10/1967 Boyen
4,263,025 A 4/1981 Godare
(Continued)

FOREIGN PATENT DOCUMENTS

CN 1044280 C 7/1999
CN 101337207 A 1/2009
(Continued)

*Primary Examiner* — Dung H Bui

(74) *Attorney, Agent, or Firm* — Laurence A. Greenberg; Werner H. Sterner; Ralph E. Locher

(57) ABSTRACT

A cyclone separator for phase separation of a fluid stream has a rotationally symmetrical housing with a hollow chamber. Feed lines feed the fluid stream into the housing substantially tangentially. At least one discharge line conducts the separated gaseous fraction. In order to ensure uniform and homogeneous flow distribution of the steam to be heated as it enters the heating phase, the hollow chamber, when viewed in the radial direction from the mid-axis, has an outflow chamber with a circular cross section and, in radial sequence, a heating chamber, an intermediate chamber, a dryer chamber and an inflow chamber. The inflow chamber is outwardly delimited by the housing. The heating chamber contains heating elements for heating the gaseous fraction. At least one fine separator and at least one associated condensate-collecting trough are arranged in the dryer chamber. The condensate-collecting trough is connected to a condensate discharge pipe in the intermediate chamber for conducting the condensate forming in the fine separator out of the hollow chamber.

14 Claims, 5 Drawing Sheets

(51) Int. Cl.

| | |
|---|---|
| ***B04C 3/04*** | (2006.01) |
| ***B04C 3/06*** | (2006.01) |
| ***B04C 5/04*** | (2006.01) |
| ***B04C 5/14*** | (2006.01) |
| ***B04C 5/20*** | (2006.01) |
| ***F22B 37/32*** | (2006.01) |

(56) References Cited

U.S. PATENT DOCUMENTS

| | | | | |
|---|---|---|---|---|
| 5,564,370 | A | 10/1996 | Giraud et al. | |
| 7,637,699 | B2 | 12/2009 | Albrecht | |
| 2007/0240391 | A1 * | 10/2007 | Becker et al. | 55/423 |
| 2009/0010721 | A1 | 1/2009 | Albrecht | |
| 2012/0023944 | A1 | 2/2012 | Bruce | |

FOREIGN PATENT DOCUMENTS

| | | | |
|---|---|---|---|
| DE | 1196219 | B | 7/1965 |
| DE | 26 15 520 | A1 | 10/1977 |
| DE | 102009015260 | A1 | 12/2010 |
| FR | 1 599 715 | A | 7/1970 |
| FR | 1599715 | A | 7/1970 |

* cited by examiner

CYCLONE SEPARATOR FOR THE PHASE SEPARATION OF A MULTIPHASE FLUID STREAM, STEAM TURBINE SYSTEM HAVING A CYCLONE SEPARATOR AND ASSOCIATED OPERATING METHOD

BACKGROUND OF THE INVENTION

Field of the Invention

The invention relates to a cyclone separator for the phase separation of a multiphase fluid stream, having a housing which is configured substantially rotationally symmetrically about a central axis and encloses a hollow chamber, having at least one feed line for the fluid stream, which is designed for an inflow of the fluid stream that is directed substantially tangentially to the inner side of the housing, and having at least one discharge line for the separated gaseous fraction of the fluid stream. The invention also relates to a steam turbine system having a high-pressure turbine and a low-pressure turbine and having such a cyclone separator. It also relates to a method for operating such a steam turbine system.

In power plants, especially nuclear power plants, in which steam is used for generating energy or converting energy, usually different turbines that operate with different steam pressure are used. The live steam generated in a power plant is for example directed into a high-pressure turbine, where it performs work and thereby expands. Before the steam is then introduced into a low-pressure turbine, which is designed for lower steam pressure, usually its water content is reduced. In addition, superheating of the steam is usually provided before it is introduced into the low-pressure turbine. By these measures, on the one hand the efficiency of the low-pressure turbine is increased, on the other hand the lifetime of the turbine is increased, since damage that could be caused for example by droplet-induced erosion or corrosion of the components is reduced or avoided.

In order to prepare the expanded steam leaving the high-pressure turbine, it is usual to use water separators and reheaters which are connected in series in terms of flow and can be structurally combined with one another in the manner of being set up next to one another or one behind the other (combined water separator/reheater). It is usual in this case for the water fraction of the steam to be reduced in a first component of the water separator/reheater, before the then substantially gaseous fraction is sent into a second component, in which it is superheated. The consequently superheated steam is then introduced into the low-pressure turbine, where it expands and thereby performs work.

Various devices may be used for separating the water fraction. These include, for example, plates along which the stream of steam is directed. Furthermore, a so-called cyclone separator or cyclone, into the substantially rotationally symmetrical housing of which the stream of steam is introduced tangentially to the inner side of the housing, may also be used for separating the water fraction. As a result, the heavier water fraction is forced outward by the centrifugal force and, on account of the flow conditions forming in the cyclone, the lighter, substantially gaseous fraction flows into the interior of the hollow chamber surrounded by the housing and collects there. In both cases, the gaseous fraction of the steam is then directed into a downstream and structurally/spatially separate second component of the water separator/reheater, in which it is superheated. This is usually achieved by the steam flowing against heating tubes, which correspondingly heat or superheat the steam by heat exchange.

An integrated structural variant of a water separator/reheater in which the separation of the water fraction and the heating of the steam take place in the same housing is described in the patent application with the official file reference DE 10 2009 015 260.1 of the applicant AREVA NP GmbH.

In order that the water separation and the steam reheating can take place satisfactorily, the respective components must be dimensioned with correspondingly large volumes, resulting directly in a corresponding material expenditure and space requirement. On the other hand, when constructing power plants, it is desirable for the least possible material and space to be required.

BRIEF SUMMARY OF THE INVENTION

The invention is therefore based on the object of providing a device for the phase separation of a multiphase fluid stream which is suitable for heating the gaseous fraction of the fluid stream, for example steam, and has the lowest requirements for material and space. Moreover, a flow distribution of the steam to be heated that is uniform and as homogeneous as possible as it enters the heating phase should be ensured. It is also intended to provide a steam turbine system having a high-pressure turbine and a low-pressure turbine in which such a cyclone separator can be used particularly advantageously. Furthermore, it is intended to provide a method for operating such a steam turbine system.

With respect to the cyclone separator for the phase separation of a multiphase fluid stream, this object is achieved according to the invention by the hollow chamber, when viewed in the radial direction from the central axis, having an outflow chamber with a substantially circular cross section and, following said chamber in the sequence mentioned, a heating chamber, an intermediate chamber, a dryer chamber and an inflow chamber, each with a substantially annular cross section, wherein the inflow chamber is delimited in the outward direction by the housing, wherein the heating chamber contains heating elements designed for heating the gaseous fraction, wherein at least one fine separator and at least one assigned condensate-collecting trough are arranged in the dryer chamber, and wherein the at least one condensate-collecting trough is connected to at least one condensate discharge pipe, which is arranged in the intermediate chamber and through which the condensate forming in the at least one fine separator in the operating state is discharged from the hollow chamber.

Advantageous configurations of the invention are the subject of the subclaims.

The invention is based on the idea that one reason for the comparatively great space requirement of conventional water separators/reheaters is that the separation of water from the steam originally leaving the high-pressure turbine and the subsequent superheating of the separated gaseous fraction are performed at successive times in two spatial regions or apparatus components that are spatially separate from each other and are arranged one behind the other in the manner of a series flow connection. As a result, specific requirements are imposed on the structural design of the water separators/reheaters, which for system-related reasons need a relatively large installation space.

As has been realized, however, these two spatial regions do not necessarily have to be arranged structurally one behind the other in separate spaces. This is so because, assuming suitable flow conditions, these spatial regions can also be arranged nested one inside the other in a single housing, the liquid separation and the superheating of the gaseous fluid fraction for a given volume element of the fluid being performed substantially at the same time or one shortly after the other.

Such suitable flow conditions are provided by a water separator of a cyclone type of construction. The flow impinging tangentially on the inner side of the housing of the cyclone has the effect that the centrifugal force acting on the stream makes the separation of the heavy component, for example water, take place in the outer region of the hollow chamber surrounded by the housing, on the inner side of the housing. The lighter, gaseous fraction of the original fluid stream, for example steam, thereby flows into the interior of the hollow chamber. If heating elements for heating or superheating the gaseous fraction are then arranged in an inner or central region of the hollow chamber, especially in a heating chamber, in such a way that the passing over of the lighter phase into the inner region is further enabled, the gaseous fractions are heated or superheated directly while they are passing over into the inner region. This creates inside the outer spatial region designed for the water separation an inner spatial region, which substantially contains the superheated steam. The superheated, gaseous fraction can then be brought out from the inner spatial region and used further as and when required. This nesting of the two functionally different spatial regions one inside the other allows a combined water separator/reheater to be realized in an extremely compact type of construction. In addition to this, material costs can be saved, since only a single housing is necessary for the two processes.

A concentric arrangement of the condensate discharge pipes between the fine separators and the heating elements particularly achieves the effect when flow impinges on the heating chamber of a well-measured pressure loss, which leads to a uniform distribution of the steam along the housing and consequently ensures an optimized flow distribution in the impingement of the flow on the heating elements. This makes it possible to dispense with perforated plates or similar devices for flow deflection.

Such a construction is not confined to the treatment of steam. It can be used whenever one or more phases of heavy particles or constituents are to be separated out from a multicomponent fluid stream, and the light fraction or fractions of the original fluid stream are intended to be heated.

A plurality of condensate-collecting troughs arranged in the dryer chamber, which together form at least approximately a ring of condensate-collecting troughs, are advantageously provided in at least one plane lying perpendicular to the central axis, each of the condensate-collecting troughs being connected to an associated condensate discharge pipe respectively arranged in the intermediate chamber.

Each condensate-collecting trough may be assigned here to one or more of the fine separators or dryers. As an alternative to this, it is also conceivable to use precisely one annular condensate-collecting trough in each plane or in a number of the planes.

The preferred number of annularly distributed condensate-collecting troughs and the associated condensate discharge pipes and the dimensioning thereof (for example length or diameter) may depend on several factors, such as the dimensioning of the housing, the throughput of condensate passing through the condensate discharge pipes in the operating state of the cyclone separator, and the desired pressure loss that is intended to take place as the fluid stream flows through the arrangement of condensate discharge pipes.

In a preferred embodiment, a first plane is provided with a first ring of condensate-collecting troughs and at least a second plane is provided with a second ring of condensate-collecting troughs, wherein the first ring of condensate-collecting troughs is assigned a first group of condensate discharge pipes and the second ring of condensate-collecting troughs is assigned a second group of condensate discharge pipes.

In this way, condensate which forms in the dryers at various points, as seen along the central axis of the housing, can flow off into the next condensate-collecting trough respectively in the direction of flow of the condensate. Seen along the central axis of the housing, the condensate-collecting troughs of the first and second planes may be respectively arranged in pairs one above the other. Depending on the length of the housing and the throughput of condensate in the operating state of the cyclone, three or more planes may also be provided.

The condensate discharge pipes are preferably respectively connected only to one condensate-collecting trough, in order to ensure a high throughput. In an alternative configuration, at least some of the condensate discharge pipes are connected to more than one condensate-collecting trough.

In a longitudinal portion of the intermediate chamber in which both condensate discharge pipes of the first group and condensate discharge pipes of the second group run, they are advantageously arranged alternately, as seen in the circumferential direction of the cyclone separator. This longitudinal portion of the intermediate chamber preferably extends over the entire length of the intermediate chamber, all of the condensate discharge pipes being taken over the full length of the housing. In this way, the inflow conditions for the gaseous phase of the fluid stream, for example the steam to be heated, is the same throughout, as seen along the central axis. In this case, some of the condensate discharge pipes may in certain longitudinal portions serve exclusively for guiding the flow, while in other longitudinal portions they additionally act as an outflow for the condensate formed in the fine separators.

This type of arrangement may be generalized to more than two planes, it then being possible for example for a cyclical arrangement of the condensate discharge pipes belonging to the respective groups to take place in the circumferential direction.

The condensate discharge pipes are advantageously aligned parallel to the central axis, whereby the steam substantially experiences a reduction in velocity perpendicular to the central axis of the housing in the impingement of its flow.

A uniform impingement of the flow is achieved in the radial direction if the perforation points of all the condensate discharge pipes through a cross-sectional plane lying perpendicular to the central axis lie substantially on a circle. The pipes then all have in the radial direction the same spacing from the inner side of the housing and from the central axis, so that no undesired pressure inhomogeneities occur along the circumferential direction of the housing.

The respective condensate-collecting trough is advantageously connected to the respective condensate discharge pipe by a feed line. The feed line connects the condensate-collecting trough to the respective condensate discharge pipe in terms of flow in the manner of an intermediate piece, condensate being able to flow out of the corresponding condensate-collecting trough into the condensate discharge pipe through the feed line in the operating state. The feed line may be connected to the condensate-collecting trough and/or the condensate discharge pipe for example by means of a welded connection. It may also be formed as an integral component part of the condensate-collecting trough or the condensate discharge pipe.

In a preferred embodiment, the heating chamber with the heating elements is designed for a throughflow of the gaseous fraction of the fluid stream. It thereby separates the hollow chamber into the regions lying between the inner side of the housing and the heating chamber, that are the intermediate chamber, the dryer chamber and the inflow chamber, and an outflow chamber lying within the heating chamber. A clear separation of the two spatial regions allows a separation of the two successive processes in an optimized way. It is particularly advantageous if the fraction of the fluid stream flowing into the inflow chamber has the smallest possible fraction of the heavy component, in order to save energy for the heating thereof. If used in a steam turbine system, the efficiency and lifetime or servicing intervals of the turbine can be increased as a result.

For the inflow of the heated or superheated steam into a low-pressure turbine over the most direct possible path, it is advantageous if the cyclone separator has precisely two discharge lines, wherein the two discharge lines are connected in terms of flow to the outflow chamber at the opposite ends of the housing, as seen in the direction of the central axis.

Depending on the composition of the multicomponent fluid stream, different configurations of the rotationally symmetrical housing are advantageous. For example, the housing may taper in its cross section in one direction, especially in the direction of the discharge line (flow outlet). A separation of water from a steam/water stream is preferably carried out in a housing configured substantially as a hollow cylinder.

In order to make optimized use of gravitational force for separating the heavy component of the multiphase fluid stream, the central axis of the housing preferably has a substantially vertical alignment. The heavy component of the fluid stream then moves (flows) downward on the inner side of the housing and can be collected or discharged there. Generally, a vertical setup of the cyclone separator is advantageous, since in this case the gravitational force does not cause any imbalance in the turbulent flow.

For the use of the device in a steam turbine system having a high-pressure turbine and a low-pressure turbine, the steam taken from the high-pressure turbine should be fed to the low-pressure turbine in the superheated state. For this purpose, the heating elements should be designed with regard to their heating output for the superheating of the gaseous fraction of the fluid stream, especially steam.

The most effective possible use of the device is achieved if the multiphase fluid stream is fed through a number of feed lines. If the feed lines—at least in the region of their housing connection—lie in a plane substantially perpendicular to the central axis of the housing, they are advantageously designed in such a way that the velocity vector of the fluid stream flowing into the hollow chamber has a component that is directed out of this plane. What is meant here is an averaged velocity vector, which is averaged over the individual component parts of the fluid stream. The fluid streams flowing in through the various feed lines can thereby be prevented from colliding with one another, and the fluid streams are provided with a preferential direction in the direction of the central axis. The fluid stream in this case advantageously flows in at an angle of between 10° and 30°, especially of approximately 15°, to a plane perpendicular to the central axis. This means that the turbulent flow occurring as a result of the wall geometry is preferably superposed with a velocity component directed in the direction of the central axis, so that altogether a helical flow is formed. With a vertical setup of the separation device, the velocity component directed in the direction of the central axis advantageously points downward.

Four feed lines, which are arranged such that they are distributed uniformly and symmetrically over the circumference of the housing, are preferably used for the inflow of the fluid stream. With suitable dimensioning of the housing, in this way the inflowing fluid stream can be advantageously divided between four regions of equal size of the inner side of the housing, without the individual streams meeting and thereby disturbing one another.

The flow conditions forming in the housing of the device ensure that the gaseous fraction of the fluid stream flows into the interior of the hollow chamber surrounded by the housing. There, it flows against the heating elements and is thereby heated or superheated. The direction with which the flow can impinge on the heating elements can be optionally optimized by baffle plates or guide vanes arranged in the inflow chamber. For example, in this way the effect can be achieved that the flow impinges on the heating tubes substantially frontally, or the tangential component may be reduced. Since, on the other hand, these directing elements make the inflow chamber smaller, it should be decided according to the application whether and with which dimensions they are used.

The cyclone separator is suitable both for single-stage and multi-stage (re-) superheating. For two-stage or multi-stage superheating, for example, two or more groups of heating elements may be arranged one behind the other in the heating chamber, as seen perpendicularly to the central axis. The heating elements associated with the individual groups may in this case be designed for respectively different heating outputs or heating temperatures.

In a preferred embodiment of the device, the heating elements are of a tubular configuration. For heating or superheating the gaseous fraction, the heating elements may be flowed through by a fluid heating medium, especially steam. For multi-stage heating, for example steam at different pressures and/or different temperatures may be used in different groups of heating elements for this purpose.

For heating of the gaseous fraction that is as effective as possible, straight tubes which are aligned parallel to the central axis of the building are used as heating elements. For this purpose, a plurality of tubes are arranged in the heating chamber and may be differently configured according to the application. For example, smooth tubes or finned tubes, or favorable combinations of these types of tube, may be used. The individual tubes are expediently spaced apart from one another in such a way that the remaining intermediate spaces allow the gaseous phase that is separated from the fluid flow to pass over as unhindered as possible from the outer inflow chamber into the inner outflow chamber. On the other hand, of course, a certain "compactness" of tubes is required in order to realize the intended heating effect.

The heating tubes are preferably combined to form tube bundles. In this case, use can be made of so-called annular bundles, in which the tubes are arranged such that they are distributed more or less uniformly in the heating chamber. Alternatively or in combination with this, so-called individual bundles may be used. In this case, a number of heating elements that are adjacent to one another may be respectively combined to form a bundle. The individual bundles may be preassembled and can be handled as a whole. As and when required, they can be fitted, removed and exchanged more easily than individual tubes.

With respect to the steam turbine system, the aforementioned object is achieved according to the invention by the feed line or all the feed lines of the separation device described above being connected to the steam outlet of the high-pressure turbine, and the discharge line or all the discharge lines being connected to the steam inlet of the low-pressure turbine. In this way, the steam from the high-pressure turbine is introduced into the separating device, in which on the one hand the water fraction is separated from the steam and on the other hand the gaseous fraction is superheated.

This superheated steam is subsequently introduced into the low-pressure turbine, where it is used for further energy generation.

With respect to the method, the aforementioned object is achieved according to the invention by the steam that is extracted from the steam outlet of the high-pressure turbine being directed into a hollow chamber which is enclosed by a housing that is substantially rotationally symmetrical about a central axis, whereby the steam is set in rotation and its gaseous fraction is separated from the liquid fraction and is collected in an inner region of the housing, and wherein the substantially gaseous fraction is directed through fine separators as it passes over into the inner region, its liquid fraction being reduced still further, and then sent through an annularly distributed arrangement of condensate discharge pipes, is subsequently heated by heating elements and is then fed to the steam inlet of the low-pressure turbine.

In a preferred version of the method, at least some of the heating elements are of a tubular configuration, that is to say form heating tubes. The live steam generated by a steam generator is directed into at least some of the heating tubes, whereby the gaseous fraction of the fluid stream that is introduced into the separation device and comes into contact with the outer sides of the heating tubes is heated or superheated. Alternatively, or in combination with this, bled steam may be extracted from the high-pressure turbine and then directed into at least some of the heating elements. In this way, especially a two-stage or multi-stage superheating of the gaseous fraction of the fluid stream can be achieved.

The advantages achieved with the invention are especially that a clever arrangement of heating elements within a cyclone separator allows separation of a heavy component or a liquid phase of a multiphase fluid stream with simultaneous heating or superheating of the gaseous fraction of the fluid stream to be realized in a decidedly space-saving and economical way in terms of material and construction costs. As a result, the device is especially suitable for use in installations that have to be constructed in a confined space. For the primary separation of the heavy component or phase of the fluid stream, the cyclone principle is thereby used. The installation of fine separators allows a further reduction of the heavy component. The arrangement of the condensate discharge pipes in an annular space between the fine separators and heating elements allows an optimized flow distribution to be achieved by a selective pressure loss. This leads to a further saving of material, since the dual function of the condensate discharge pipes makes it possible (to the greatest extent) to dispense with perforated plates or similar components.

A steam turbine system in which such a separating device is connected between a high-pressure turbine and a low-pressure turbine can be realized in a particularly compact and material-saving type of construction. In this case, in a vertically set-up housing, the device may be provided substantially directly under the high-pressure turbine, so that the gas from the steam outlet of the high-pressure turbine at the upper end of the housing can flow into the device. By means of discharge lines at the lower and/or upper end of the housing, the superheated steam can then be fed to the low-pressure turbine.

BRIEF DESCRIPTION OF THE SEVERAL VIEWS OF THE DRAWING

Various exemplary embodiments of the invention are explained below with reference to the highly schematized drawing, in which.

DESCRIPTION OF THE INVENTION

The same parts are provided with the same designations in all the figures.

Figure 1:
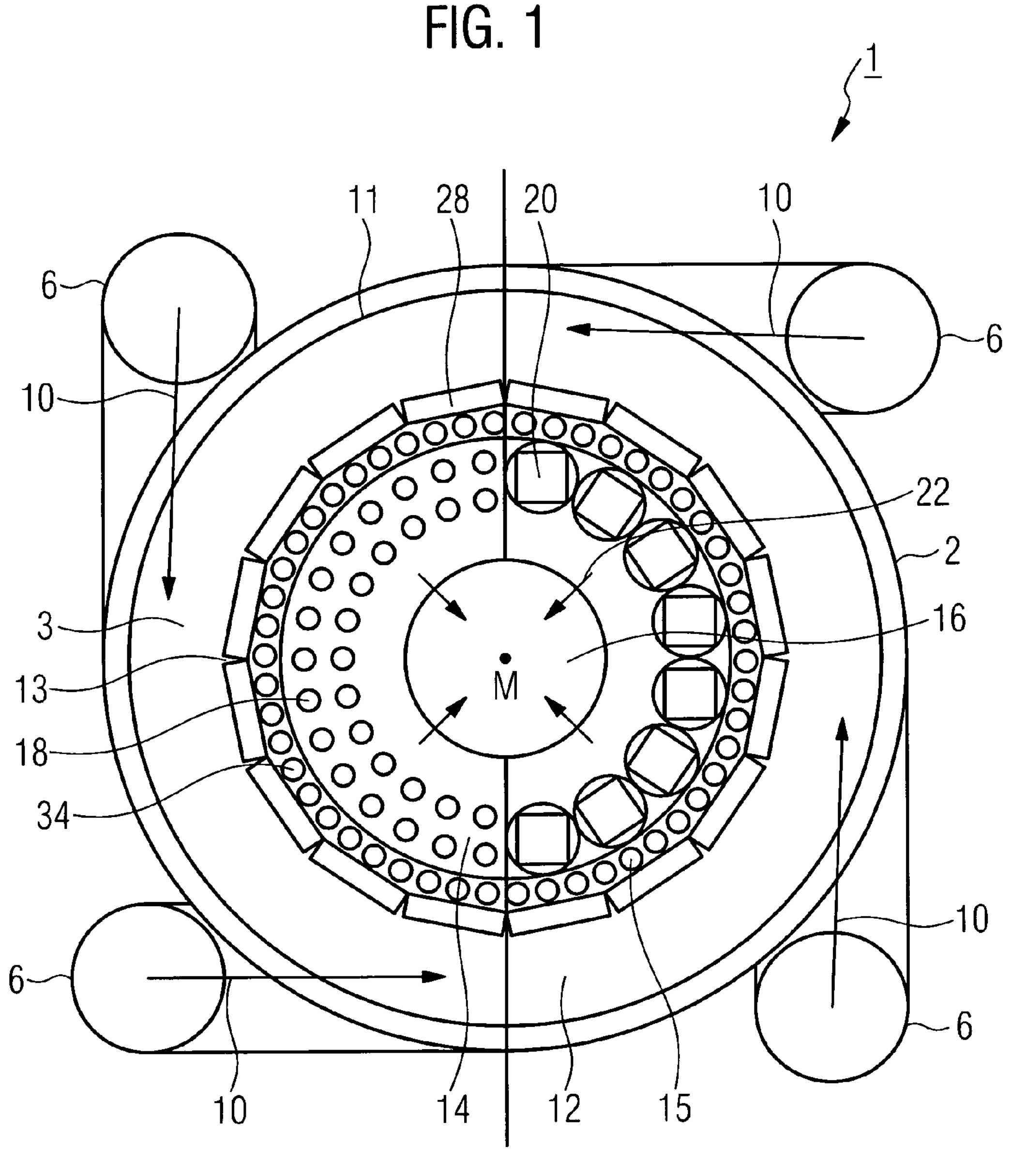
FIG. 1 shows two different semicircular partial cross sections, placed one against the other, of two different possible configurations of a cyclone separator for the phase separation of a multiphase fluid stream, having a housing which is configured substantially rotationally symmetrically about a central axis, the respective cross-sectional plane being chosen as perpendicular to the central axis.

The cyclone separator 1, shown in FIG. 1, for the phase separation of a multiphase fluid stream comprises a housing 2, which is configured substantially rotationally symmetrically about a central axis M and as a hollow cylinder, encloses a hollow chamber 3 and has four feed lines 6 let into it. In this case, the left and right halves of FIG. 1 respectively correspond to a possible configuration of the cyclone separator, in reality both halves each being realized in one of the two ways shown here. In a preferred configuration, the housing 2 with a substantially vertically aligned central axis M has a diameter of about 6 meters.

The multiphase fluid stream (not depicted) flows in this case into the hollow chamber 3 surrounded by the housing 2 in a direction of inflow 10 substantially tangentially to the inner side 11 of the housing. The fluid stream may be, for example, steam, which is directed from the steam outlet of a high-pressure turbine installed in a steam turbine system through the feed lines 6 into the housing 2 of the cyclone separator 1. The housing 2 is preferably produced from steel or high-grade steel, though other materials may also be advantageous depending on the field of application.

The fluid stream is thereby set in rotation, the centrifugal force acting on the fluid stream drawing the heavy component of the fluid stream, in this case water, outward onto the inner side 11 of the housing. On account of the flow conditions forming in the hollow chamber 3, the gaseous fraction of the fluid stream moves from an inflow chamber 12 through a dryer chamber 13 and an intermediate chamber 15 into a heating chamber 14. The cross-sectionally annular heating chamber 14 spatially encloses a cylindrical outflow chamber 16, lying inside the housing 2.

Figure 2:
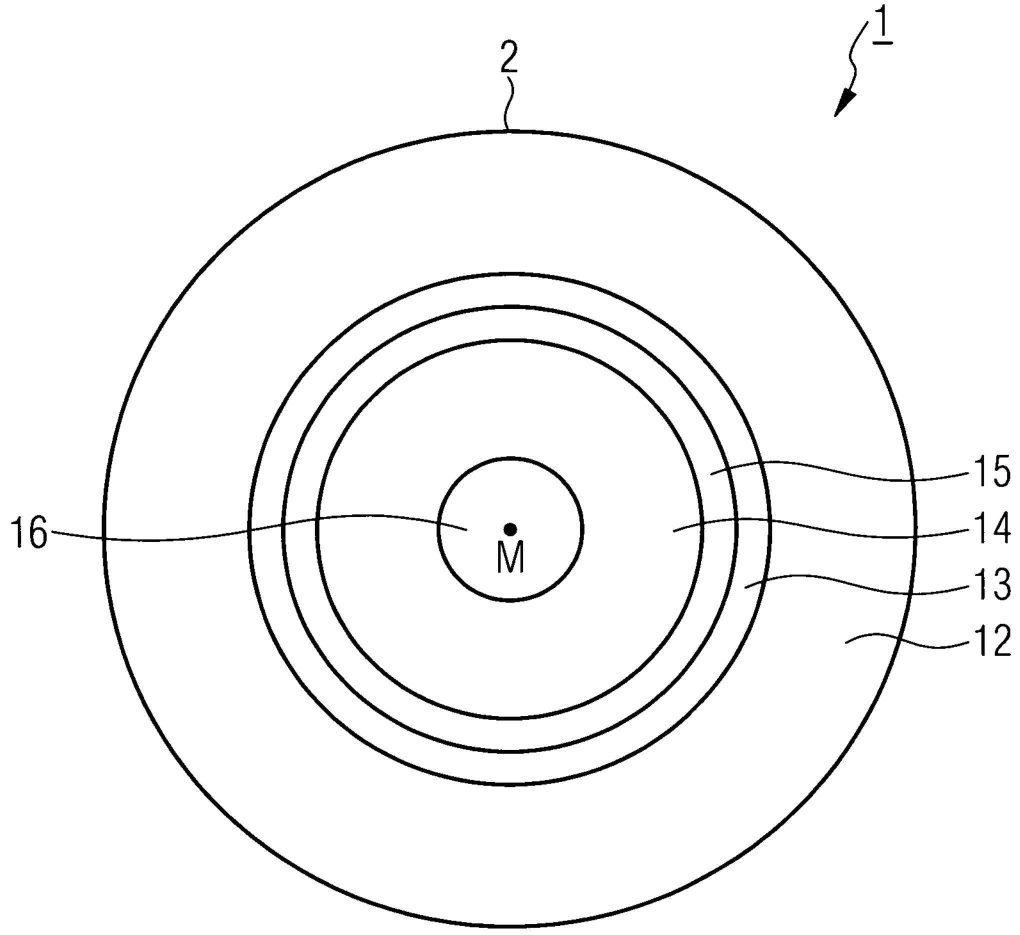
FIG. 2 shows a cross-sectional plane perpendicular to the central axis of the cyclone separator that is shown in FIG. 1, in which the various spatial regions are schematically indicated.

The spatial arrangement (radially outward from the central axis M) of the outlet chamber 16, the heating chamber 14, the intermediate chamber 15, the dryer chamber 13 and the inflow chamber 12 is schematically illustrated in FIG. 2. While the outflow chamber 16 is cylindrically formed, the chambers that lie further out in the housing 2 form as it were shells with a respectively annular cross section. Their imaginary inner and outer cross-sectional delimitations form concentric circles, the common center point of which lies on the central axis M.

Arranged in the heating chamber 14 of the embodiment of the cyclone separator 1 that is shown in FIG. 1 are heating elements, which are designed with regard to their heating output for the superheating of the gaseous fraction of the fluid stream. Individual heating tubes 18, which altogether form as it were annular bundles, may be used in this case. With a length of the tubes used in the annular bundle of about 11.5 m and a housing diameter of 6 m, a heating surface of about 22 000 $m^2$ is made available in the case of a total number of about 7900 tubes with an outside diameter of the bundle of about 3.6 m and a core diameter of the finned tubes of in each case about 22.4 mm. As an alternative to this or in combination with the heating tubes 18, individual bundles 20 may be used. The heating tubes 18 or individual bundles 20 are impinged by the flow of the gaseous fraction of the fluid stream in the direction of flow 22. The gaseous fraction is superheated in the heating chamber 14, whereupon it flows further into the outflow chamber 16. From there, it is directed further through discharge lines 24 (not depicted in FIG. 1) into the low-pressure turbine.

With heating elements impinged directly by the flow of the fluid stream, previous experience suggests that a separation efficiency of the water of up to about 80% can be achieved. This means that the steam flowing onto the heating tubes 18 or individual bundles 20 still has a water fraction of about 2.6%.

In order to reduce the water fraction still further, fine separators 28 are provided in the dryer chamber 13. Variously configured plates may be used for example as fine separators 28. So-called vane-type droplet separators, which consist of groups of corrugated sheets, may also be used. These separating elements are usually fixed or anchored in a frame. The fine separators 28 are assigned condensate-collecting troughs 32 (not depicted in FIG. 1), into which the condensate forming in the fine separators 28 in the operating state flows off. The condensate-collecting troughs 32 are preferably arranged in the dryer chamber 13. They are fixed (for example welded) to the respective fine separators 28 in such a way that the condensate from the respective fine separators 28 is collected in the assigned condensate-collecting trough 32. The condensate-collecting troughs 32 are connected in terms of flow to condensate discharge pipes 34, which are arranged in the intermediate chamber 15 and through which the condensate is removed from the hollow chamber 3. The condensate discharge pipes 34 run substantially in a straight line parallel to the central axis M and extend over the entire length of the housing 2. They are respectively anchored at the two ends of the housing 2 with the aid of a plate 90. Between the plate 90 arranged at the bottom of the housing and the inner side 11 of the housing there is a gap 94 or annular gap, through which the water collecting on the inner side 11 of the housing can flow off in the downward direction.

The condensate discharge pipes 34 perform a dual function. On the one hand, the condensate forming in the fine separators 28 is directed through them downward out of the hollow chamber 3. On the other hand, their spatial arrangement between the fine separators 28 and the heating tubes 18 leads to an advantageous pressure loss of the fluid stream flowing over from the inflow chamber 12 to the outflow chamber 16, whereby the vertical flow distribution in the heating chamber 14 improves. In particular, a banking-up pressure in the lower region of the hollow chamber 3 is avoided or greatly reduced. Furthermore, the arrangement of the condensate discharge pipes 34 also allows the direction in which flow impinges on the heating tubes 18 to be influenced. The turbulences produced as a result have the effect of improving the heat transfer of the fluid stream to the first series of tubes of the bundle.

With the aid of the fine separators 28, the water fraction can be reduced to <0.5% to 1%. However, the introduction of the fine separators 28 into the dryer chamber 13 is accompanied by a pressure loss and the inflow chamber 12 is made smaller in comparison with a configuration without fine separators 28. In the exemplary embodiment, the fine separators 28 are arranged in the dryer chamber 13 on an outer circle with a diameter of about 4 m around the central axis M and provide a flow-impinging area of about 70 $m^2$.

In order to improve the impingement of the flow on the heating elements or to reduce or completely eliminate the tangential component of the velocity of the impinging flow, baffle plates, perforated plates or guide vanes may be arranged in the inflow chamber 12 or else in the chambers that lie further inward. However, the inflow chamber 12 is reduced in size by these deflecting devices. Baffle plates, perforated plates and guide vanes may be respectively used in the cyclone separator 1 on their own or in various combinations with one another.

Tube bundles, as are used inter alia in heat exchangers, may be used as heating elements. In order to provide a heating surface that is as large as possible, finned tubes or slotted finned tubes may be used here. Smooth tubes may also be used—optionally in combination with said finned tubes. The tubes are thereby flowed through for example by live steam at about 70 bar and/or—in the case of multi-stage heating—bled steam of the high-pressure turbine at about 30 bar. The heating tubes 18 preferably have on the outer side a round cross-sectional profile, in order to oppose the fluid stream to be heated with as little flow resistance as possible.

Figure 3:
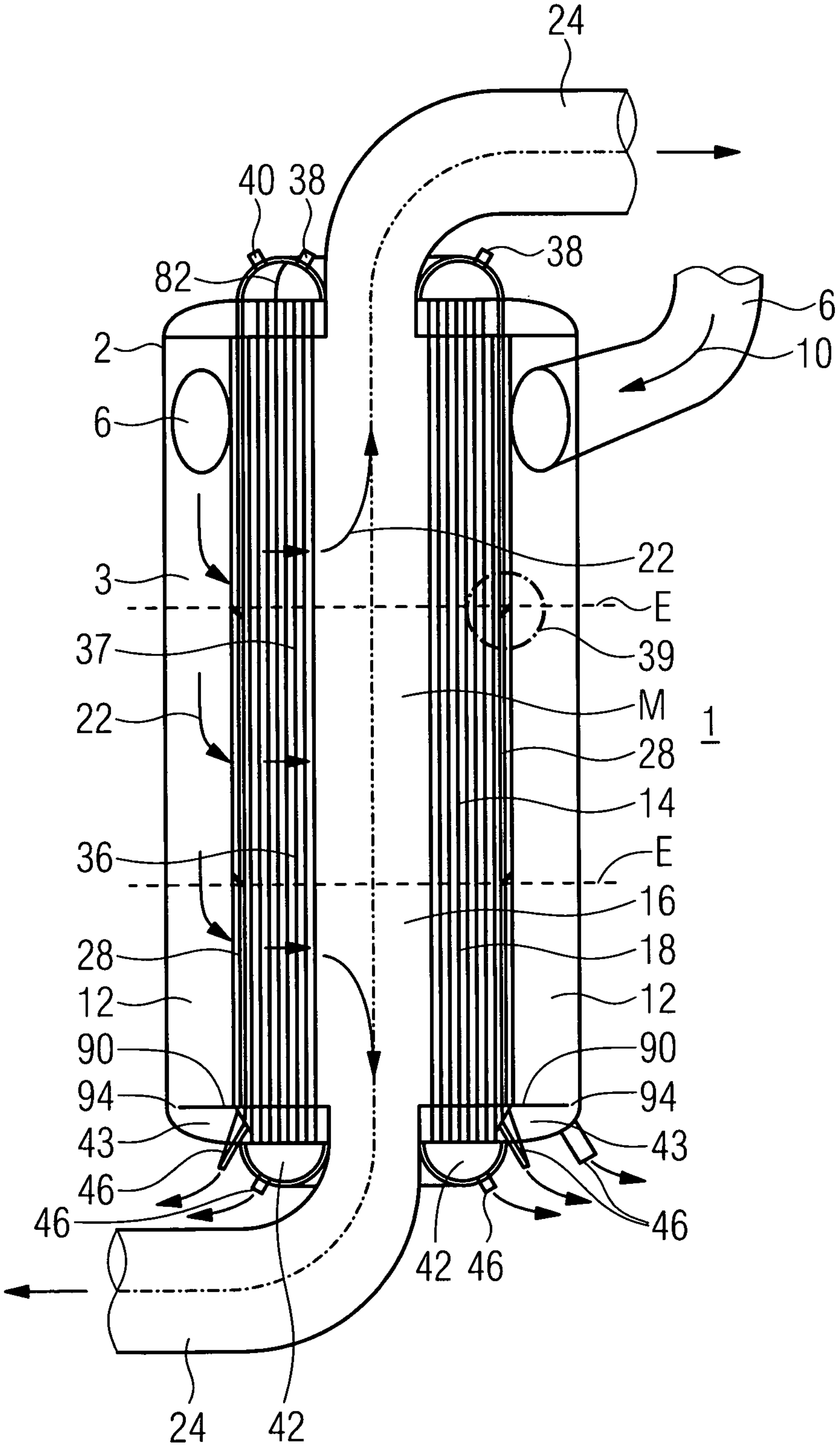
FIG. 3 shows a longitudinal section of a cyclone separator, the two halves to the left and right of the central axis corresponding to different preferred embodiments.

The cyclone separator 1 from FIG. 1 is shown in FIG. 3 in a left-hand and right-hand longitudinal section, in a possible embodiment in each case. In both embodiments, the housing 2 of the cyclone separator 1 is set up substantially vertically. The housing 2 is configured substantially as a hollow cylinder and rotationally symmetrically about the central axis M. Four feed lines 6 are respectively provided, distributed uniformly over the circumference of the housing 2 and preferably having a diameter of 1400 mm. The steam leaving the high-pressure turbine flows with a downwardly directed velocity component—beyond the effect of gravitational force—with a gradient of about 15° into the hollow chamber 3, whereby the desired, substantially spiral or helical flow guidance is promoted. It is directed through the feed lines 6 into the housing 2 and flows against the inner side 11 of the housing in a tangential direction. The water fraction of the steam is thereby separated on the inner side 11 of the housing. On account of the flow conditions forming in the cyclone separator 1, and optionally with the aid of baffle plates, guide vanes or perforated plates, the predominantly gaseous fraction of the steam flows into the dryer chamber 13, further into the intermediate chamber 15, the heating chamber 14 and subsequently into the outflow chamber 16.

Respectively provided at the upper and lower ends of the housing 2 is a discharge line 24 of about 1800 mm in diameter, which is respectively connected in terms of flow to the outflow chamber 16. After being heated, the steam can thus flow out of the housing 2 in both upward and downward directions and is subsequently directed through the discharge lines 24 to the low-pressure turbine (not depicted). The cyclone separator 1 is expediently arranged spatially with respect to the low-pressure turbine in such a way that the discharge line 24 connected in terms of flow to the outflow chamber 16 can be connected substantially directly to the inlet opening of the low-pressure turbine. The discharge line 24 leaving at the lower end of the outflow chamber 16 is diverted upward toward the inlet opening of the low-pressure turbine.

The embodiment of the cyclone separator 1 that is shown in the detail on the left of the image is designed for a two-stage heating or superheating of the steam. In the heating chamber 14 configured as an annular space, heating tubes 18 are fitted in the form of an annular bundle. The steam first flows (indicated by the direction of flow 22) through the fine separators 28 and subsequently through the arrangement of condensate discharge pipes 34, which oppose the steam to some extent with a resistance and thus lead to a pressure loss. This makes it possible to prevent the steam from being distributed non-uniformly in the vertical direction, whereby under some circumstances the heating tubes 18 could not be used for heating over their full length.

The steam then flows through a first stage 36 or first group of heating tubes 18, lying concentrically around the central axis M in the heating chamber 14. Subsequently, on its path to the outflow chamber 16, it flows through a second stage 37 or second group of heating tubes 18, which is arranged concentrically within the first stage 36. The outer, first stage 36 is supplied with bled steam at about 30 bar from the high-pressure turbine through a bled-steam feed line 40. The inner, second stage 37 of heating tubes 18 is supplied with live steam from a steam generator 66 (not depicted) at about 70 bar through a live-steam feed line 38. Between the inlet headers for the groups of heating tubes 18 supplied with different steam, separating plates 82 may be provided for separating the respective steams. This similarly applies to the outlet headers. Instead of arranging two tube bundles one inside the other, an annular bundle with a separate tube sheet may also be used.

The steam consequently heated in two stages flows into the outflow chamber 16 and from there further through the discharge lines 24 to the low-pressure turbine. The gaseous fraction is thus successively heated on its way into the interior of the outflow chamber 16. This type of two-stage heating can obviously be generalized to multi-stage heating with the aid of additional steam feed lines and groups of tubes.

In the detail on the right of the image in FIG. 3, an embodiment with single-stage heating is shown. The heating tubes 18 are all supplied with live steam by way of the live-steam feed line 38.

The fine separators 28 are connected to condensate-collecting troughs 32, from which the condensate is directed by way of condensate discharge pipes 34 through condensate discharge lines 46 out of the housing 2.

The condensate flowing down on the inner side 11 of the housing, here water, runs into the condensate discharge 43 and leaves the housing 2 through a condensate discharge line 46. In addition, a second condensate discharge 42 is provided in the recessed bottom region of the housing 2 and can be used for discharging the condensate collecting in the lower part-cavity through a condensate discharge line 46.

The embodiments of the cyclone separator 1 that are represented in FIG. 3 may be combined with the configurations with annular bundles or individual bundles 20 that are represented in FIG. 1.

Figure 4:
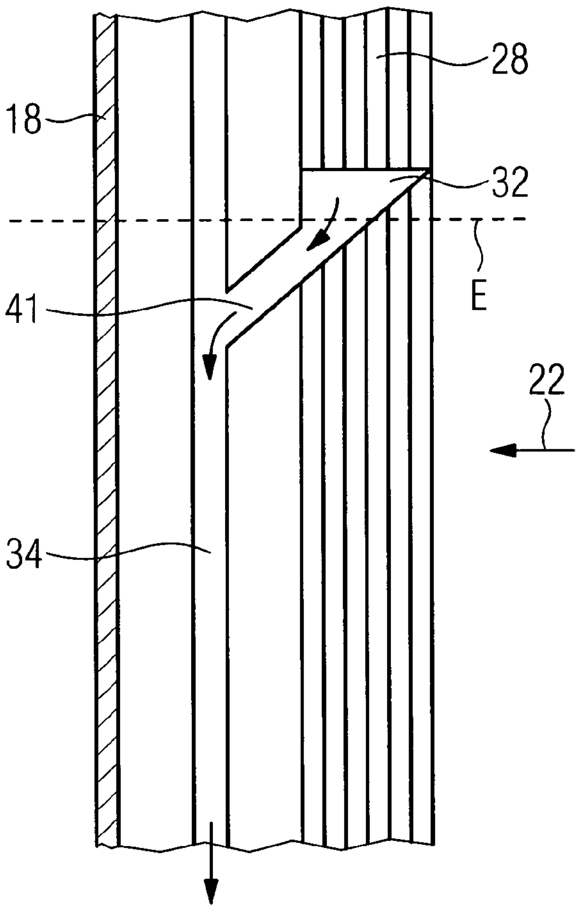
FIG. 4 shows a detailed illustration of the detail from FIG. 3 marked by a dashed circle, having a condensate-discharge trough, which is connected to a condensate discharge pipe by way of a feed line.

The detail identified in FIG. 3 by a dashed circle 39 is shown enlarged in FIG. 4. The dryer or fine separator 28 is connected to a condensate-collecting trough 32, into which the condensate forming in the dryer or fine separator 28 in the operating state of the cyclone separator 1 runs. It runs through one or more feed lines 41 downward through condensate discharge pipes 34 that are respectively connected to the feed line 41. The condensate-collecting trough 32 may be differently configured according to requirements. Preferably, each fine separator 28 is assigned a condensate-collecting trough 32. It is also possible to use a single annular condensate-collecting trough 32, into which the condensate from all the fine separators 28 can flow off.

Figure 5:
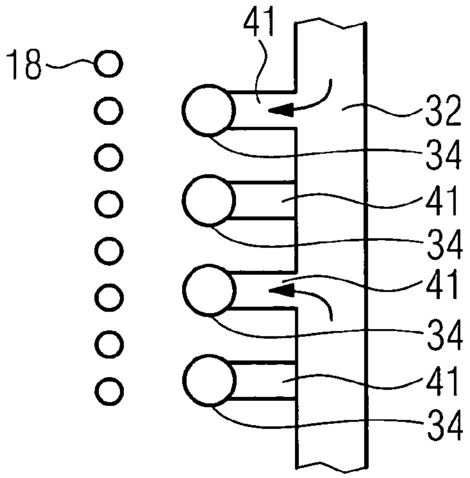
FIG. 5 shows a plurality of condensate discharge pipes and a condensate-collecting trough of the cyclone separator according to FIG. 1 to FIG. 3, shown here in cross section as viewed in the direction of the central axis.

Condensate-collecting troughs 32 are preferably provided at various heights in the housing 2. In FIG. 3, the condensate-collecting troughs 32 in the housing 2 are fitted in two different planes. FIG. 5 shows a condensate-collecting trough 32 of the upper plane in plan view of the cyclone separator 1 that is represented in FIG. 3. In FIG. 5, two feed lines 41 connected to said trough in terms of flow and condensate discharge pipes 34 connected to said feed lines are shown. Two further pairs of feed lines 41 and condensate discharge pipes 34 can also be seen, these pairs not being connected in terms of flow to the condensate-collecting trough 32 that is depicted. Rather, they are connected to the condensate-collecting trough lying further below, concealed here by the upper condensate-collecting trough 32. The condensate discharge pipes 34 belonging to the two condensate-collecting troughs 32 lying one above the other at different heights are provided alternately along the circular circumference in which they are fitted. The curvature of the circle cannot be seen in the entirely schematic and not-to-scale FIG. 5.

This structural variant in which each condensate discharge pipe 34 is connected to precisely one condensate-collecting trough 32 has the advantage that a high throughput of condensate is ensured in the operating state. As an alternative to this, however, a number of condensate-collecting troughs 32 may also be connected in terms of flow to the same condensate discharge pipe 34.

Figure 6:
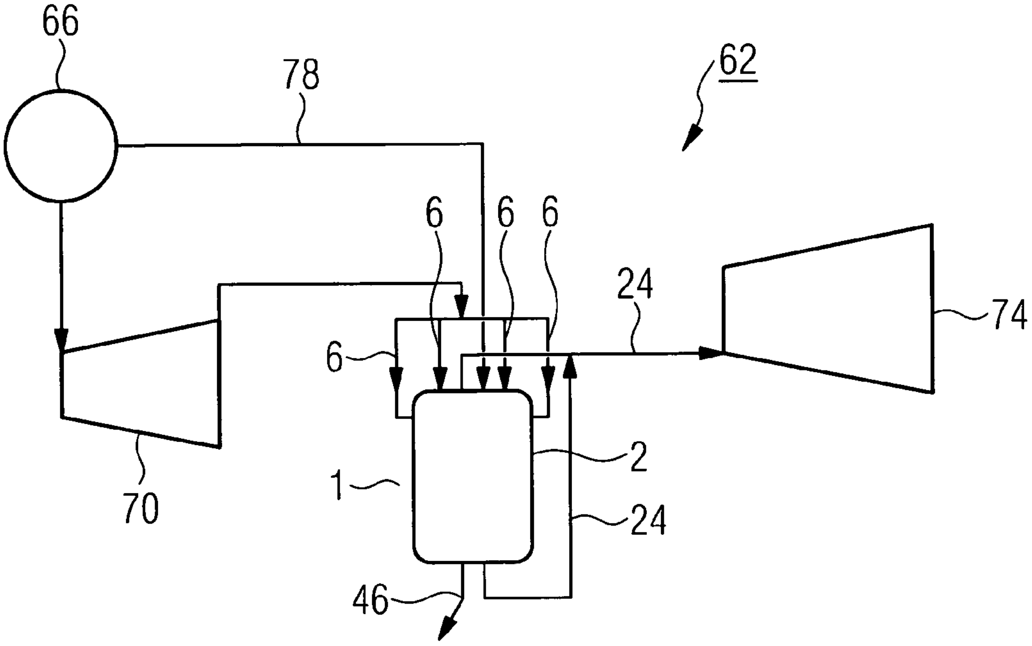
FIG. 6 shows a schematized block diagram of a steam turbine system, having a high-pressure turbine, a low-pressure turbine, a steam generator and a cyclone separator for the phase separation of a multiphase fluid stream with an integrated reheater according to an embodiment that is shown in FIG. 1 to FIG. 5.

An advantageous embodiment of a steam turbine system 62 is shown in FIG. 6. It comprises a steam generator 66, a high-pressure turbine 70, and a low-pressure turbine 74. The cyclone separator 1 is connected in terms of flow between the high-pressure turbine 70 and the low-pressure turbine 74. The live steam generated in the steam generator 66 is directed into the high-pressure turbine 70 to perform work. While performing work, the steam in the high-pressure turbine 70 expands, whereby it increases its water fraction. In order that the steam in the low-pressure turbine 74 can be used as efficiently as possible for energy generation, it must be prepared in a suitable way. For this purpose, its water fraction must be reduced, before it is subsequently transformed into a superheated state. For this reason, the steam leaving from the steam outlet of the high-pressure turbine 70 is directed by way of a distributor through feed lines 6 into the housing 2 of the cyclone separator 1. There, the steam flows in tangentially to the inner side 11 of the housing and is thereby set in rotation. The gaseous fraction of the steam flows into the interior of the housing, where it is transferred into a superheated state by heating elements, especially heating tubes. From there, the superheated steam is directed through discharge lines 24 into the steam inlet of the low-pressure turbine 74. There, the steam prepared in this way can be used further for energy generation. In this exemplary embodiment, the heating tubes (not depicted here) of the cyclone separator 1 are supplied with live steam from the steam generator 66 through the heating feed line 78. Alternatively or in addition, bled steam could be extracted from the high-pressure turbine 70 for this purpose.

It goes without saying that the cyclone separator 1 is not restricted to use in steam turbine systems. It can be used substantially wherever the heavier component or phase is to be separated from a multiphase fluid stream and the gaseous fraction is to be heated or superheated. As explained above, the heavy component of the fluid stream may in this case be water. However, applications in which the heavy component consists of solid particles are also conceivable. It could for example be soot or dirt particles.

LIST OF DESIGNATIONS

1 cyclone separator
2 housing
3 hollow cavity
6 feed line
10 direction of inflow
11 inner side of the housing
12 inflow chamber
13 dryer chamber
14 heating chamber
15 intermediate chamber
16 outflow chamber
18 heating tube
20 individual bundle
22 direction of flow
24 discharge line
28 fine separator
32 condensate-collecting trough
34 condensate discharge pipe
36 first stage
37 second stage
38 live-steam feed line
39 dashed circle
40 bled-steam feed line
41 feed line
42,43 condensate discharge
46 condensate discharge line
62 steam turbine system
66 steam generator
70 high-pressure turbine
74 low-pressure turbine
78 heating feed line
82 separating plate
90 plate
94 gap
M central axis
E plane

The invention claimed is:

1. A cyclone separator for the phase separation of a multiphase fluid stream, comprising:

a housing configured substantially with rotational symmetry about a central axis and enclosing a hollow chamber;

at least one feed line for the fluid stream, configured for feeding in the fluid stream substantially tangentially to an inner wall of said housing;

at least one discharge line for a gaseous fraction separated out of the fluid stream;

said hollow chamber, as viewed in a radial direction from said central axis, having an outflow chamber that is substantially circular in cross section and, following said outflow chamber in sequence, a heating chamber, an intermediate chamber, a dryer chamber, and an inflow chamber, each having a substantially annular cross section;

said inflow chamber being delimited in an outward direction by said housing;

said heating chamber containing heating elements for heating the gaseous fraction;

at least one fine separator and at least one assigned condensate-collecting trough being disposed in said dryer chamber;

at least one condensate discharge pipe connected to said at least one condensate-collecting trough, said at least one condensate discharge pipe being arranged in said intermediate chamber and discharging from said hollow chamber condensate forming in said at least one fine separator during operation thereof; and wherein a first plane is provided with a first ring of said condensate-collecting troughs and at least a second plane is provided with a second ring of said condensate-collecting troughs, wherein said first ring of said condensate-collecting troughs is assigned a first group of said condensate discharge pipes and said second ring of said condensate-collecting troughs is assigned a second group of said condensate discharge pipes.

2. The cyclone separator according to claim 1, wherein said at previously presented least one condensate-collecting trough is one of a plurality of condensate-collecting troughs disposed in said dryer chamber, said plurality of troughs together forming at least approximately a ring of condensate-collecting troughs, disposed in at least one plane lying perpendicular to said central axis, each of said condensate-collecting troughs being connected to an associated condensate discharge pipe respectively arranged in said intermediate chamber.

3. The cyclone separator according to claim 1, wherein, in a longitudinal portion of said intermediate chamber in which both condensate discharge pipes of said first group and condensate discharge pipes of said second group run, said condensate discharge pipes are arranged alternately, as seen in the circumferential direction of the cyclone separator.

4. The cyclone separator according to claim 1, wherein said condensate discharge pipes are aligned parallel to said central axis.

5. The cyclone separator according to claim 1, wherein said condensate discharge pipes are formed with perforation points and said perforation points of all of said condensate discharge pipes through a cross-sectional plane lying perpendicular to said central axis lie substantially on a circle.

6. The cyclone separator according to claim 1, comprising precisely two discharge lines, wherein said two discharge lines are connected in terms of flow to said outflow chamber at mutually opposite ends of said housing, as seen in the direction of said central axis.

7. The cyclone separator according to claim 1, wherein said housing is substantially a hollow cylinder.

8. The cyclone separator according to claim 1, wherein said central axis is substantially vertically aligned.

9. The cyclone separator according to claim 1, wherein said at least one feed line is one of four feed lines distributed uniformly and symmetrically about a circumference of said housing.

10. A steam turbine system, comprising a high-pressure turbine and a low-pressure turbine and a cyclone separator according to claim 1, wherein said at least one feed line is connected to a steam outlet of said high-pressure turbine, and said at least one discharge line is connected to a steam inlet of said low-pressure turbine.

11. The cyclone separator according to claim 1, wherein the respective said condensate-collecting trough is connected to a respective said condensate discharge pipe by way of a feed line.

12. The cyclone separator according to claim 11, wherein said feed line is configured such that a velocity vector of the fluid stream flowing into said hollow chamber has a component in a direction of said central axis of said housing.

13. The cyclone separator according to claim 1, wherein said heating elements are tubular elements configured to conduct therethrough a fluid heating medium.

14. The cyclone separator according to claim 13, wherein the fluid heating medium is steam.

* * * * *